May 2, 1944.   E. E. FRANZ   2,347,773

MOLDING APPARATUS

Filed Dec. 6, 1941

INVENTOR
E. E. FRANZ
BY
E. R. Nowlan
ATTORNEY

Patented May 2, 1944

2,347,773

UNITED STATES PATENT OFFICE 2,347,773

MOLDING APPARATUS

Erwin E. Franz, Cranford, N. J., assignor to Western Electric Company, Incorporated, New York, N. Y., a corporation of New York Application December 6, 1941, Serial No. 421,869

2 Claims. (Cl. 18—42)

This invention relates to molding apparatus, and more particularly to means for molding materials, either viscously liquid or solid, capable of flowing under pressure, especially the numerous thermoplastic and thermosetting compounds commonly known as artificial resins, molding plastics, and the like.

The molding of these substances under suitable heat and pressure is a relatively simple matter so long as the articles to be molded are relatively solid and thick without deep cavities or thin-walled portions. However, when articles are to be molded which have deep bores, slender projections, thin walls containing more massive portions, or analogous configurations, it is sometimes difficult to enforce complete filling out of surface detail and bubbleless soundness of thin or slender parts especially in portions of the mold remote from the material entry gate.

An object of the present invention is to provide a mold particularly adapted to pressure molding of artificial resins, molding plastics and the like material to form articles comprising unusually irregularly formed cross sections and especially such having deep recesses, slender projections, or thin-walled portions, and which shall be simple to use and of relatively few parts and easily dissectible for removal of a molded article.

With the above and other objects in view, one embodiment of the invention may present a mold for forming an irregularly exteriorly contoured tube closed at one end and having slender projections at the other end, the mold comprising a matrix block or chase having a slightly tapered bore therethrough, a pair of complementary mold halves to be contained in the bore and separated along a plane through the axis of the recess, a rod-like core supported axially in the recess, and a core block supported in the mold halves near one end thereof and closing the mold chamber and supporting the rod-like core, the other end of the mold chamber formed in the mold halves being extended as a cylindrical compression chamber adapted to receive a compression ram.

Other objects and features of the invention will appear from the following detailed description of embodiments thereof, taken in connection with the accompanying drawing in which the same reference numerals are applied to identical parts in the several figures, and in which Fig. 1 is a view in central longitudinal section of a device constructed in accordance with the invention;

Figure 1:
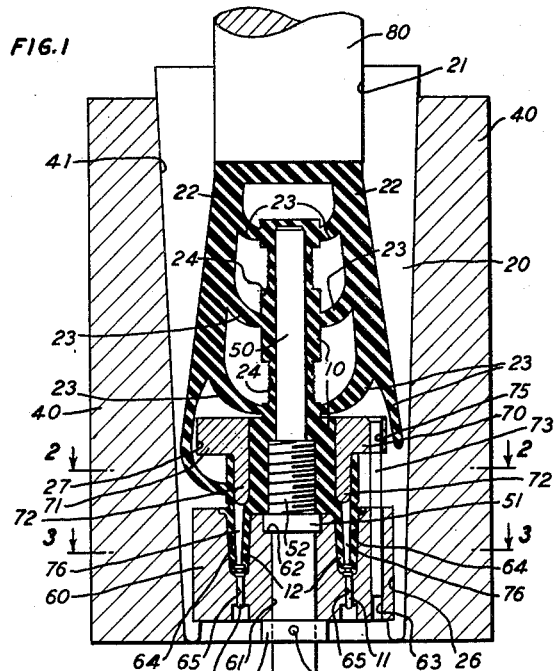
Figure 2:
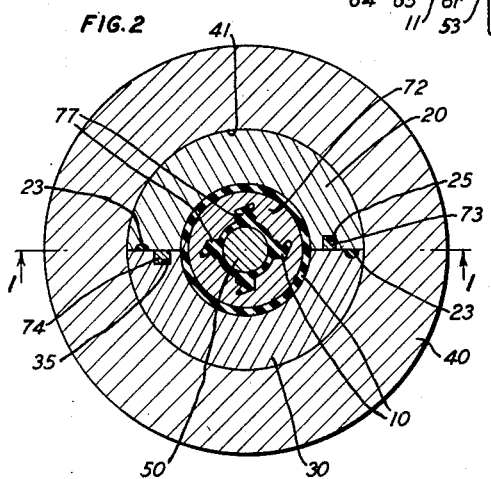
Fig. 2 is a section on the line 2—2 of Fig. 1.
Figure 3:
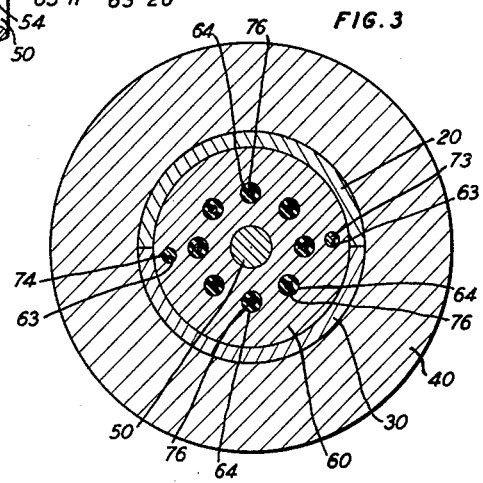
Fig. 3 is a section on the line 3—3 of Fig. 1.

As herein disclosed the invention is shown and described as embodied in a mold for forming a relatively complexly organized, integrally unitary body 10 of insulating material, e. g., Bakelite, for use in electrical apparatus, and having metal terminal pins 11 embedded in slender projections 12 extending from one end of the body. The mold comprises a pair of complementary mold halves 20 and 30 contained in a chase 40, an axial core 50, a core block 60 and a core ring 70.

The chase 40 is a block of steel or other suitable material, here shown as cylindrical externally, but of any suitable outer form. Axially within it is a bore 41 preferably slightly conical in form as shown, to receive and hold securely in close apposition the two mold halves 20 and 30 which are formed exteriorly to fit snugly together therein. These three parts, chase and two mold halves, being made of the same material preferably, to have the same temperature coefficient of expansion, when properly made and fitted will fit and hold so rigidly as to minimize notably flash formation between the halves of the mold even under heavy molding pressures. At the same time, the mold as a unit may be readily knocked out of the chase to be emptied.

At their upper ends the mold halves are shaped to form when put together a cylindrical compression chamber 21 to be filled with molding compound and to receive a compression ram 80. From the bottom of the chamber 21, a downwardly and outwardly inclining channel or runner 22 extends on either side of the axis. Branch runners 23 lead toward the axis from the main runners 22 to communicate with the mold cavity or chamber 24, an axial, elongated chamber of abruptly and considerably varying diameter. Near the lower ends the mold halves 20 and 30 are formed to present a cylindrical recess 26 to contain and support the outwardly cylindrical core block 60, which forms the bottom end wall of the mold cavity.

In the present instance the core block 60 has an axial bore 61, counterbored at its upper end as shown at 62. The bore receives the lower stem end of the axial core 50 which has an integral collar 51 to be received in and supported by the counterbore 62. Just above the collar 51, the operative shaft of the core 50 is formed with a screw threaded portion 52 to form a corresponding thread on the molded article. Above the threaded part 52 the core 50 extends axially up nearly to the top of the mold cavity as a smooth cylinder or rod.

It being desired, in the present instance, to form a deep, upstanding integral skirt on the molded article, surrounding and spaced from the main tubular body, the mold halves 20 and 30 are also recessed as at 27, some distance above the core block 60, to receive and support the outwardly turned flange 71 of the core ring 70 whose annular body 72 is to separate the skirt of the molded article from the body of the molded article.

To assist in the correct assembly of the whole as hereinafter described, two pins 73 and 74 pass vertically through bores 75 in the flange 71 and into bores 63 in the block 60, the mold members 20 and 30 being formed with square channels 25 and 35 respectively to allow the pins to pass. The pins 73 and 74 are so located that the slot or channel 25 in the parting face of the mold half 20 will give space for the pin 73, while the similar slot or channel 35 in the parting face of the mold half 30 gives space for the pin 74. Each of the pins 73 and 74 is cylindrical where it is housed in the ring flange 71 and in the block 60 but is of square cross section between or of some other convenient form having some diameter larger than the cylindrical portions above and below, to provide stop shoulders by which the ring 70 and block 60 may be accurately spaced apart in assembly. For convenience these pins may be headed or riveted over into the countersunk upper ends of the bores in the flange 71, thus attaching the pins permanently to the ring 70.

In the present instance the block 60 is formed in its upper surface with eight deep slender recesses 64, narrowing slightly downwardly and opening at their upper ends into the mold cavity so that they are in effect extensions of the cavity to form relatively long and slender horns on the molded article. A straight slender bore 65 communicates through the block from the bottom with each of the recesses 64. The horns or projections to be formed in the recesses 64 are to be hollow and to communicate with the annular space between the skirt of the article and its body. Hence the ring 70 is formed with slender depending projections 76 to act as cores in the recesses 64.

The inner periphery of the ring 70 in the present instance is formed with vertical grooves 77 to form desired vertical radially outwardly extending flanges on the body of the article to be molded.

To describe the use of the whole let it be assumed that the device is separated and its components all apart except that the pins 73 and 74 are permanently riveted into the ring 70. The block 60 is laid right side up and eight contact pins 11 are dropped into the eight recesses 64 so that their stems lie in the bores 65. The ring 70 is then placed on the block 60, with the pins 73 and 74 in the bores 63, and forced down until accurately spaced from the block by the ends of the square middle portions of the pins 73 and 74. The projections 76 on the ring 70 are so dimensioned that when this is done, the tips of the projections 76 are forced down into the heads of the contact pins 11 and expand these into the upper ends of the bores 65, thus sealing these tightly and preventing escape of molding material. The core 50 may be pushed into the bore 61 either before or after the ring 70 is put in place as may be most convenient. To avoid accidental displacement of the core, a collar 53 may be put on its lower end and held by a removable pin 54, to lock the core 50 in the block 60.

The block 60, core 50 and ring 70 thus assembled together may then be pushed laterally into place as a unit into one of the mold halves, say 20, and the other core half brought laterally into place, the block 60 sliding into the recesses 26, the flange 71 into the recesses 27 and the pins 73 and 74 into the slots 25 and 35. The mold halves are then closely apposed, abutting tightly over their parting faces with the block, ring and axial core rigidly held in their proper places. This assembly is then dropped into the chase 40 and pushed down until the wedging action of the tapered mold in the tapered bore of the chase locks all securely together.

The entire device may then be placed on the bed of a suitable press (not shown) in the position shown in Fig. 1. A suitable amount of molding material is placed in the compression chamber 21, the ram 80 is introduced and driven down. The material being such as will flow under pressure, passes down the main runners 22 and enters the mold cavity via the branch runners 23 at a plurality of points distributed virtually along the whole length of the cavity. Thus despite internal and external friction of the material the entire mold cavity is filled and the hydrostatic pressure is sufficiently distributed throughout all of the material in the cavity to ensure a sound and completely finished and filled molding being produced.

After the material has set, the ram is withdrawn entirely. The combined mold halves may then be knocked out of the chase and separated. The molded object and its sprues will ordinarily remain in one of the halves and will retain the block, ring and axial core in that half. This assemblage may then be removed from that half and the mold halves laid aside. The sprues and fins are carefully broken off. After this is done the ring is loosened and drawn off axially over the top end of the molding. The pin 54 and collar 53 are removed downwardly. The core 50 is then rotated to unscrew it a little at 52 from the molding, which will loosen the core in the molding and also loosen and lift away the molding from the block a trifle. The core may then be pulled out of the block upwardly together with the molding and removed from the molding; or the core may be unscrewed entirely from the molding and the latter lifted away from both block and core, after which these may be separated if desired.

The arrangement of matched, externally tapered mold halves to be locked together in a correspondingly internally tapered, one piece chase, and with a compression chamber entirely contained within the mold halves and independent of the chase, presents important advantages. Making the chase is a simple machine tool matter of boring, reaming, and, if necessary, grinding, or lapping, in a lathe, so far as the interior of the chase is concerned. The exterior, corresponding surface of the matched mold halves is an equally simple, machine tool job of turning and, if necessary, grinding or lapping, in a lathe. The mold recesses for the block 60 and ring 70 can be cut with a side mill or cherry as can also the mold cavity proper, when molded articles of circular cross section such as that illustrated are in view. Recesses such as 64 are made by boring and reaming.

The only difficult and expensive die sinker's job is that of cutting the runners 22 and 23; and even here the difficulty and expense are much reduced since there is nothing critical about cross sectional form, longitudinal form, or dimension of the runners. All the accurate work required to make the whole arrangement can be done by common machine tools. Even the runners can be routed out by power tools. The compression chamber too can be bored and, if necessary, ground or lapped in the combined halves, in a simple manner and with machine tools.

Because the mold halves are held and locked together in the chase only by the wedging effect of the matched, tapered parts, if the parting faces of the mold halves are lapped flat or otherwise carefully matched, flash produced in the molding along the parting plane is reduced to a minimum. Yet the locked mold can be easily and quickly knocked out of the chase after the molding.

The branch runners 23 can be made as noted above in a relatively simple, quick and inexpensive manner. Hence it is not costly to provide as many of them and to proportion and distribute them so as to ensure the flow of molding material in such quantity, both relative and absolute, to each component of almost any form of article to be molded as will produce a soundly solid and completely filled out molding.

Figure 4:
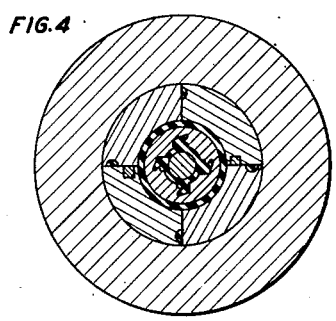
Fig. 4 is a view similar to Fig. 2 but on a smaller scale of a modified form.
Figure 5:
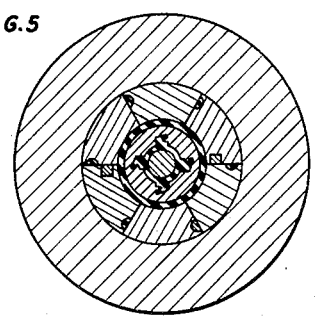
Fig. 5 is a similar view of another modified form.

As herein disclosed and illustrated, the mold proper consists of the two halves 20 and 30 matched together along one parting plane. This allows for two independent runners 22 and two sets of branch runners 23. At the same time, the compression chamber 21 can be made relatively long and narrow, thus reducing the total pressure on the ram required to effect the necessary molding pressure on the material. For bulkier articles to be molded than that illustrated, the mold halves may be split along a second parting plane at right angles to the original one, or even along two additional parting planes at 60° to each other and to the original one, thus making a mold proper consisting of four or six segments matched along two or three parting planes. The two or even three additional pairs of main runners and pairs of sets of branch runners may be made in the mold in the same simple and inexpensive fashion. Such constructions are indicated in Figs. 4 and 5 respectively.

Other modifications of and departures from the illustrative embodiment disclosed may be made without departing from the spirit and scope of the invention as pointed out and described in the appended claims.

What is claimed is:

1. A molding apparatus comprising a plurality of matched segments of a mold proper having together a conical exterior surface and parted along planes containing the axis of the said surface, and a chase to receive the matched segments and having a conical bore to receive and match the conical exterior surface of the matched segments, the matched mold segments being formed in their parting surfaces with corresponding matching segments of a plurality of cylindrical recesses each to receive an externally cylindrical core member and hold the same against either lateral or longitudinal displacement, in combination with a core member in each of the said recesses and an aligning member extending through corresponding bores in two of the core members and in an intervening portion of a mold segment.

2. A holding apparatus comprising a plurality of matched segments of a mold proper having together a conical exterior surface and parted along planes containing the axis of the said surface, and a chase to receive the matched segments and having a conical bore to receive and match the conical exterior surface of the matched segments, the matched mold segments being formed in their parting surfaces with cavities providing in the complete mold proper a compression chamber and a plurality of branched runners from the compression chamber communicating with the molding cavity of the mold proper at spaced points along the same and the matched mold segments being formed in their parting surfaces with corresponding matching segments of a plurality of cylindrical recesses each to receive an externally cylindrical core member and hold the same against either lateral or longitudinal displacement, in combination with a core member in each of the said recesses and an aligning member extending through corresponding bores in two of the core members and in an intervening portion of a mold segment.

ERWIN E. FRANZ.